US012603798B2

(12) United States Patent
Haag et al.

(10) Patent No.: US 12,603,798 B2
(45) Date of Patent: Apr. 14, 2026

(54) OPERATING A BROADBAND ACCESS NETWORK OF A TELECOMMUNICATIONS NETWORK WITH A CUSTOMER PREMISES EQUIPMENT

(71) Applicant: Deutsche Telekom AG, Bonn (DE)

(72) Inventors: Thomas Haag, Rodgau (DE); Fabian Schneider, Darmstadt (DE); Wolfgang Hurst, Langen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 378 days.

(21) Appl. No.: 18/302,013

(22) Filed: Apr. 18, 2023

(65) Prior Publication Data

US 2024/0007328 A1 Jan. 4, 2024

(30) Foreign Application Priority Data

Apr. 26, 2022 (EP) ..................................... 22170079

(51) Int. Cl.
*G06F 15/16* (2006.01)
*H04L 12/46* (2006.01)
(52) U.S. Cl.
CPC .................................... *H04L 12/46* (2013.01)
(58) Field of Classification Search
CPC . H04L 12/46; H04L 12/2898; H04L 41/0809; H04L 41/0886; H04L 12/2801
See application file for complete search history.

(56) References Cited

U.S. PATENT DOCUMENTS

| | | | | |
|---|---|---|---|---|
| 6,857,009 B1 * | 2/2005 | Ferreria | .................. | H04L 69/16 |
| | | | | 709/224 |
| 8,498,294 B1 * | 7/2013 | Monk | ................ | H04N 21/6118 |
| | | | | 370/465 |
| 9,497,168 B2 * | 11/2016 | Dingman | ............ | H04L 65/1104 |
| 2002/0075844 A1 * | 6/2002 | Hagen | ................. | H04L 63/0442 |
| | | | | 370/328 |
| 2002/0133722 A1 * | 9/2002 | Levanon | ............... | H04L 69/329 |
| | | | | 348/E7.071 |
| 2004/0024879 A1 * | 2/2004 | Dingman | ............ | H04L 63/0281 |
| | | | | 709/227 |
| 2005/0089052 A1 * | 4/2005 | Chen | .................. | H04Q 11/0478 |
| | | | | 370/329 |
| 2007/0180142 A1 | 8/2007 | Small et al. | | |
| 2009/0036159 A1 * | 2/2009 | Chen | .................. | H04L 12/2856 |
| | | | | 455/556.1 |
| 2019/0222495 A1 * | 7/2019 | Kerpez | ..................... | H04L 1/20 |

FOREIGN PATENT DOCUMENTS

EP 3544310 A1 9/2019

* cited by examiner

Primary Examiner — Razu A Miah
(74) Attorney, Agent, or Firm — LEYDIG, VOIT & MAYER, LTD.

(57) ABSTRACT

A method for operating a broadband access network of a telecommunications network with a customer premises equipment includes: a whole sale entity transmitting an authentication request to a service provider using a first application programming interface exposed by the service provider; and the whole sale entity transmitting a configuration command to the broadband access network using a second application programming interface exposed by the broadband access network. Using the first and second application programming interfaces, a customer is able to be redirected to a respective service provider based on the authentication request.

11 Claims, 3 Drawing Sheets

100 telecommunications network
101 core network
105 business and/or operations support system
110 central office point of delivery
115 switching fabric
120 access network 50, 50' customer premises equipment
51, 52 client devices 100 telecommunications network
101 core network
105 business and/or operations support system
110 central office point of delivery
115 switching fabric
120 access network 50, 50' customer premises equipment
51, 52 client devices 102 internet
103 whole sale interface
104 multiprotocol label switching network
106 policy server
107 policy storage entity or functionality
108 application programming interface
110 central office point of delivery 151 first access node
152 second access node

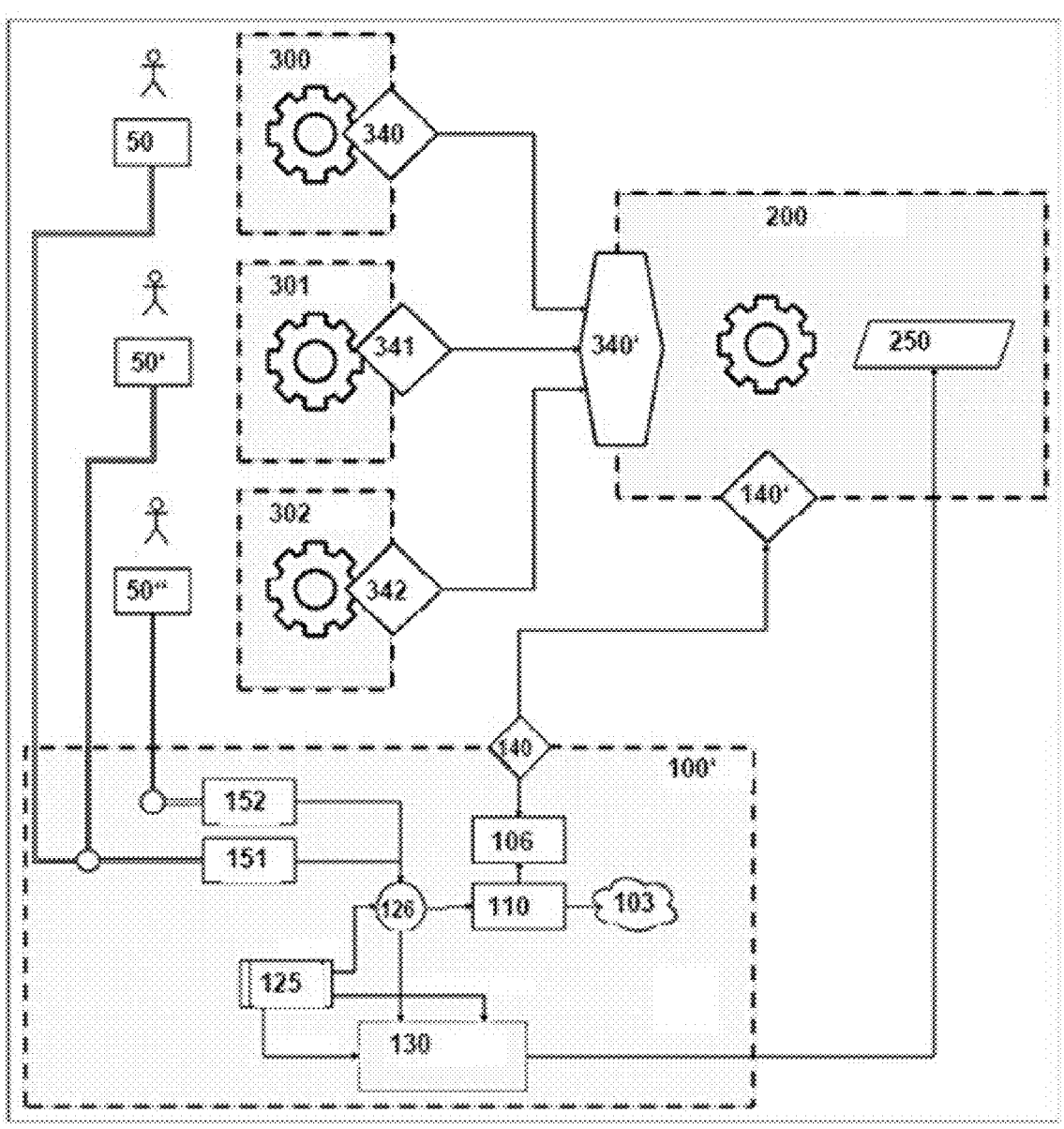

Fig. 3

50, 50', 50" customer premises equipment
100' access provider
103 whole sale interface
106 policy server
110 central office point of delivery
125 control plane
126 data steering entity or functionality
130 customer determination entity or
functionality
140, 140' application programming interfaces
151, 152 access nodes 200 whole sale provider
250 customer care entity
or functionality 300, 301, 302 service
providers 340, 340', 341, 342
application programming
interfaces

OPERATING A BROADBAND ACCESS NETWORK OF A TELECOMMUNICATIONS NETWORK WITH A CUSTOMER PREMISES EQUIPMENT

CROSS-REFERENCE TO PRIOR APPLICATIONS

This application claims benefit to European Patent Application No. EP 22 170 079.2, filed on Apr. 26, 2022, which is hereby incorporated by reference herein.

FIELD

The present invention relates a method for operating a broadband access network of a telecommunications network with a customer premises equipment, wherein the broadband access network comprises at least one access node, wherein a specific access node of the broadband access network is enabled to operatively connect the customer premises equipment to the telecommunications network in view of providing communication services and/or communication access services to a user related or connected to the customer premises equipment.

Additionally, the present invention relates to a system for operating a broadband access network of a telecommunications network with a customer premises equipment, the system comprising, besides the broadband access network, a service provider and a whole sale entity, wherein the broadband access network comprises at least one access node, wherein a specific access node of the broadband access network is enabled to operatively connect the customer premises equipment to the telecommunications network in view of providing communication services and/or communication access services to a user related or connected to the customer premises equipment.

Additionally, the present invention relates to a whole sale entity provided to be used as part of an inventive system.

Furthermore, the present invention relates to a program and to a computer-readable medium for operating a broadband access network of a telecommunications network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known telecommunications networks, a customer of such a telecommunications network is typically served by an access provider, i.e. typically the operator of the telecommunications network. In such a situation, such a customer typically needs to have a business relationship with such an access provider. However, this is not the case if a whole sale approach is followed, i.e. a customer requesting or requiring communication services, these communication services being provided by a service provider, and this service provider being different from the operator of the broadband access network. In such a whole sale scenario, there is often a network neutrality principle to be respected.

This might be a problem in case that, in order to activate or to initialize the communication service or the connectivity of the customer (typically of a customer premises equipment) to the broadband access network, identifier information relating to the customer premises equipment needs to be transmitted to the broadband access network, as this typically requires a business relationship with the access provider which would be a restriction on network neutrality.

SUMMARY

In an exemplary embodiment, the present invention provides a method for operating a broadband access network of a telecommunications network with a customer premises equipment. The broadband access network comprises at least one access node, wherein a first access node of the broadband access network is configured to operatively connect the customer premises equipment to the telecommunications network for providing communication services and/or communication access services to a user related or connected to the customer premises equipment. The broadband access network is configured to provide communication access services to the customer premises equipment via providing a whole sale interface to a service provider, wherein the service provider is configured to provide communication services to the customer premises equipment and/or to the related or connected user using the whole sale interface and the broadband access network. In case that the customer premises equipment is unknown to the telecommunications network or has previously not been connected to the telecommunications network, a whole sale entity is involved. To realize or to prepare operational usage of the customer premises equipment, the method comprises the following steps: in a first step, the whole sale entity transmits an authentication request to the service provider using a first application programming interface, wherein the first application programming interface is exposed by the service provider; and in a second step and in case of the authentication request having been granted, the whole sale entity transmits a configuration command to the broadband access network using a second application programming interface, wherein the second application programming interface is exposed by the broadband access network.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 schematically illustrates the network architecture according to the present invention including, besides the access provider or access provider functionality, as well as the service provider or service provider functionality, a whole sale provider or whole sale provider functionality.

DETAILED DESCRIPTION

Figure 1:
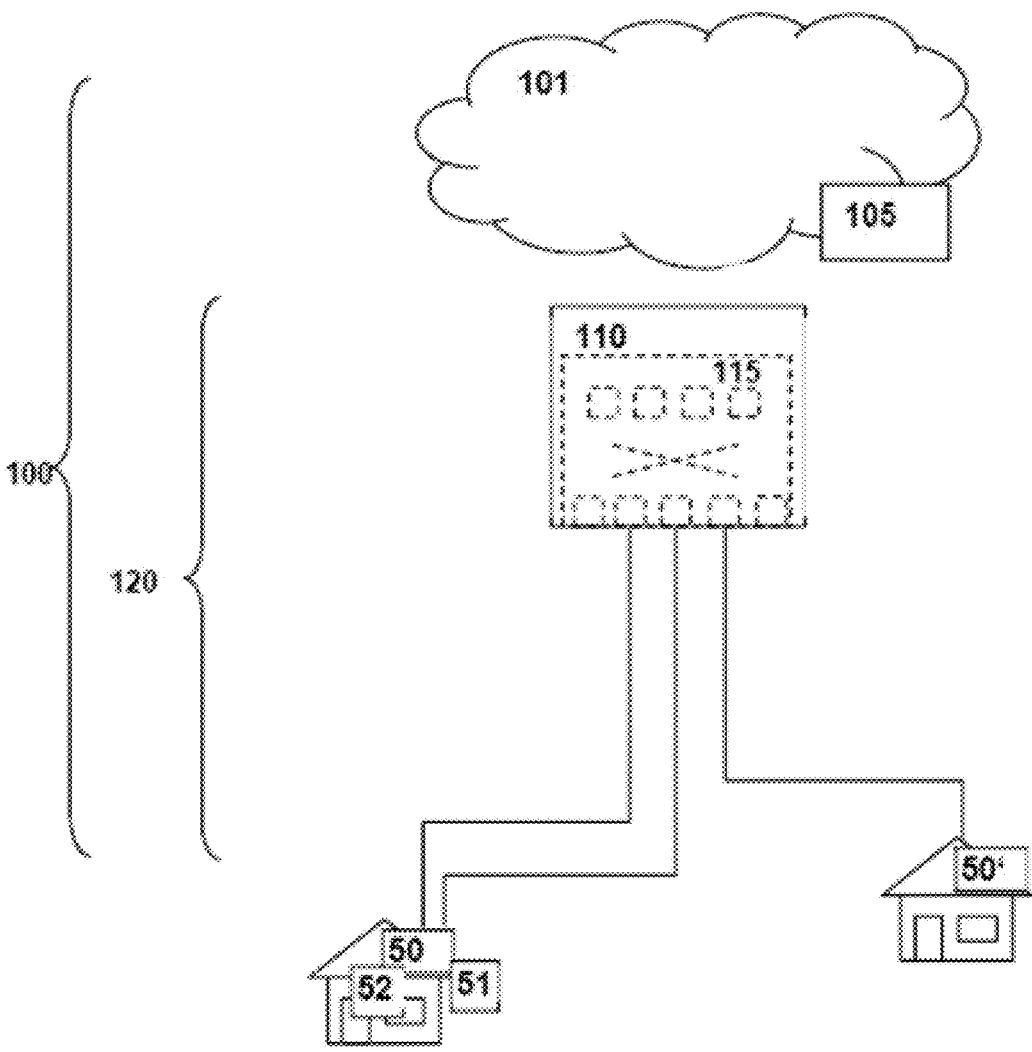
FIG. 1 schematically illustrates a telecommunications network according to the present invention, having a broadband access network with a central office point of delivery.

Exemplary embodiments of the present invention provide a technically simple, effective and cost effective solution for operating a broadband access network of a telecommunications network with a customer premises equipment, wherein the broadband access network comprises at least one access network and wherein a specific access node of the broadband access network is enabled to operatively connect the customer premises equipment to the telecommunications network in view of providing communication services and/or communication access services to a user related or connected to the customer premises equipment, wherein even in case that the customer premises equipment is unknown to the telecommunications network or has previously not been connected to the telecommunications network, the network neutrality principle is able to be respected via involving a whole sale entity. Further exemplary embodiments of the present invention provide a corresponding system, and a corresponding whole sale entity.

In an exemplary embodiment, the present invention provides a method for operating a broadband access network of a telecommunications network with a customer premises equipment, wherein the broadband access network comprises at least one access node, wherein a specific access node of the broadband access network is enabled to operatively connect the customer premises equipment to the telecommunications network in view of providing communication services and/or communication access services to a user related or connected to the customer premises equipment, wherein the broadband access network is able to provide communication access services to the customer premises equipment via providing a whole sale interface to a service provider, wherein the service provider is able to provide communication services to the customer premises equipment and/or to the related or connected user using the whole sale interface and the broadband access network, wherein, in case that the customer premises equipment is unknown to the telecommunications network or has previously not been connected to the telecommunications network, a whole sale entity is involved, wherein, in view to realize or to prepare the operational usage of the customer premises equipment, the method comprises the following steps:

in a first step, the whole sale entity transmits an authentication request to the service provider using a first application programming interface, the first application programming interface being exposed by the service provider, in a second step and in case of the authentication request having been granted, the whole sale entity transmits a configuration command to the broadband access network using a second application programming interface, the second application programming interface being exposed by the broadband access network.

It is thereby advantageously possible according to the present invention to realize an architecture (of or involving the broadband access network) that is able to ensure network neutrality while providing the possibility to initiate connectivity to even a new or previously unknown customer (from the perspective of the broadband access network or its operator) in a convenient and cost-effective manner, via involving a whole sale entity and especially using in-band communication.

Furthermore, it is advantageously possible according to the present invention that—via using a first application programming interface and a second application programming interface, especially as generic application programming interfaces—the customer is able to be redirected to the respective service provider (or the functions of the service provider offered) based on the customer identification (authentication request), wherein this also includes branching (or a redirection) to the correct service provider based on a respective data base, and especially from a generic (IP based) walled garden functionality.

According to the present invention, this is especially relevant in case of the broadband access network relying on or using (at least partly) a shared medium between, on the one hand, the access node of the broadband access network, and, on the other hand, the customer premises equipment.

For example, in a DSL-based (digital subscriber line-based) network (typically using a point-to-point connection between the access node and the customer premises equipment), the subscriber typically can be assigned to a direct (or individual) port (of the access node) and, hence, be identified in or by the broadband access network. However, when access technologies are involved using a shared network or a shared medium (such as, e.g., passive optical networks, PON) an individual subscriber (such as, e.g. a customer premises equipment) is typically not able to be assigned or identified directly; the customer port (i.e. the customer premises equipment) and its terminal (e.g., in case of using PON, an optical network terminal (ONT)) should be known to the broadband access network.

For example, in conventionally known telecommunications networks, the ONT is typically configured by the serial number of the customer premises equipment via an element management system (EMS system) of the broadband access network or the telecommunications network. For this purpose, the network operator or access provider should have this (registration) information or identifier information. Hence, in conventionally known telecommunications networks, this registration information (or identification information) of the first path needs usually to be transmitted by the customer via a second path (e.g. using a telephone, an application or app or similar), i.e. not in-band; in order to do this, however, the customer must already have a business relationship with the access provider which would not be in compliance with the principle of network neutrality.

Hence, in conventionally known telecommunications networks, especially in case of the customer premises equipment being unknown to the telecommunications network or having previously not been connected to the telecommunications network (and, especially additionally, in case of using an access technology relying on a shared network or a shared medium), a user plane communication channel is refused by the broadband access network; in the context of the present invention, this is also referred to via the term 'shield mode', i.e. access attempts initiated by unknown customers (i.e. unknown customer premises equipments) are blocked or even completely blocked, as (in such a situation in a conventionally known telecommunications network) it is still unknown, regarding this considered customer premises equipment, to which possible A10NSP carrier (i.e. to which service provider) the customer (using the considered customer premises equipment) belongs. According to legal requirements, the access provider (i.e. the telecommunications network or broadband access network) is not allowed to analyze the data stream or to process it in case of the customer premises equipment relating to a bit stream customer; since there is no possibility to inspect any data, the only solution is to block the connection, or to ignore it if the customer (i.e. the customer premises equipment considered) is unknown.

The situation of a customer premises equipment being unknown to the telecommunications network or having previously not been connected to the telecommunications network, e.g., occurs in case of an exchange of the customer premises equipment device, e.g. an exchange of the optical network terminal device. In this case, the access provider loses the association with the customer, as this association is based on an identifier information related to the hardware device of the customer premises equipment, e.g. the serial number of the optical network terminal, and when the optical network terminal is swapped or changed, this serial number changes. In conventionally known telecommunications networks, this leads the access provider (since it now classifies or detects the customer premises equipment or customer as unknown) to block or to ignore the customer and to refuse to establish connections, at least no user plane connections; in such a situation, the customer premises equipment might see a PON ranging, and also that the optical network terminal has registered at the PON tree (i.e. at the optical line terminal), but does not get an IP connection to or a DHCP/PPP response from the service edge (via the specific access node); hence no telephony, no television or other communication services are available at the considered customer premises equipment. In conventionally known telecommunications networks, typically the customer needs to take action, e.g. by calling the service provider via a secondary route, e.g. mobile, or via other routes, e.g. an app, in order to activate the customer premises equipment hardware device (e.g., the new optical network terminal serial number); the customer contacts the service provider and not the access provider, as the access provider does not know the contract data for a bit stream customer.

After the customer would have contacted (and provided identification) to the service provider (how exactly this happens is up to the service provider), the customer would transmit the new optical network terminal serial number to the service provider, and the service provider is able to provide (via the first application programming interface) configuration information (or a configuration command), especially comprising, e.g., a line ID information and the new optical network terminal serial number, (via the whole sale provider and via the second application programming interface) to the access provider; the line ID information is assigned to the service provider when the customer is provided with a line and the access provider is also known.

Hence, in contrast to conventionally known telecommunications networks, it is advantageously possible according the present invention that (in a situation where the broadband access network is able to provide communication access services to the customer premises equipment via providing the whole sale interface to the service provider, and the service provider is able to provide communication services to the customer premises equipment and/or to the related or connected user using the whole sale interface and the broadband access network) the whole sale entity is involved in view to realize or to prepare the operational usage of the (unknown) customer premises equipment via the whole sale entity transmitting the authentication request to the service provider using the first application programming interface, and (in case of the authentication request having been granted) by the whole sale entity transmitting the configuration command to the broadband access network using the second application programming interface.

According to the present invention, the broadband access network comprises (or the telecommunications network comprises) a customer determination entity or functionality such that (in case that a specific access node of the broadband access network is enabled to operatively connect the customer premises equipment to the telecommunications network in view of providing communication services and/or communication access services to a user related or connected to the customer premises equipment) it is advantageously possible that a user plane communication channel is able to be established (between the customer premises equipment and the customer determination entity or functionality, via the specific access node, resulting, especially, in the possibility of an automated federation of connection information to customer information)—in case that the customer premises equipment is unknown to the telecommunications network (i.e. also to the broadband access network) or has previously not been connected to the telecommunications network (i.e. also to the broadband access network). According to the present invention, it is achieved via an identifier information, relating to the customer premises equipment, being transmitted, by the customer premises equipment, to the specific access node, and the user plane communication channel being established between the customer premises equipment and the customer determination entity or functionality, via the specific access node.

Hence, according to the present invention, even in case that the user is completely unknown to the (broadband access) network (i.e. in case of a new user and whole sale user), the broadband access network recognizes, automatically registers and assigns the unknown user. This is able to be done in a non-discriminatory manner, detached from a business relationship with a provider (i.e. in accordance with the network neutrality principle). The invention introduces two new functional layers, with new functions (customer catcher) as well as new interfaces to automate the processes and thus enables the discrimination-free separation between service provider and access provider.

Hence, according to the present invention, the possibility of an infrastructure is provided that works and is built to provide connectivity (or initiate connectivity via a mechanism and a technique that allows fully automated registration or re-registration of customers) to unknown subscribers (unknown to the telecommunications network or the broadband access network), especially on a shared network such as a PON or a cable network, and including the integration of whole sale industry partners (especially acting as service providers), being connected via an A10NSP interface.

The telecommunications network according to the present invention might be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks). Hence, the presented invention can be applied in both fixed disaggregated networks (e.g. ONF (Open Network Foundation) SEBA (SDN-Enabled Broadband Access) 2.0) and mobile networks (e.g. via 5G, 6G), as well as in hybrid mixed forms.

According to an embodiment of the present invention, it is advantageously possible and preferred that the authentication request comprises identifier information relating to the customer premises equipment as well as authentication or credential information, wherein both the identifier information and the authentication or credential information are transmitted, by the customer premises equipment and in a third step prior to the first step, to the specific access node, wherein especially the identifier information is transmitted, by the customer premises equipment, using a control plane channel, especially using a ranging protocol, between the customer premises equipment and the specific access node, wherein especially the broadband access network comprises a customer determination entity or functionality, and the authentication or credential information is transmitted, by the customer premises equipment, using a user plane communication channel between the customer premises equipment and the customer determination entity or functionality, via the specific access node.

It is thereby advantageously possible to easily and effectively implement exemplary embodiments of a method according to the invention.

According to another embodiment of the present invention, it is furthermore advantageously possible and preferred that the customer premises equipment is connected to the specific access node using a shared medium, especially a point-to-multipoint access mechanism and especially a passive optical network or a part thereof, or a data over cable service interface specification coaxial, DOCSIS, cable network, wherein the customer premises equipment especially corresponds to an optical network terminal or an optical network unit, and wherein the specific access node especially corresponds to an optical line terminal, wherein especially the identifier information relating to the customer premises equipment corresponds to a hardware address of the customer premises equipment, especially a medium access control (MAC) address.

It is thereby advantageously possible to easily and effectively implement exemplary embodiments of a method according to the invention.

According to another embodiment of the present invention, it is furthermore advantageously possible and preferred that the whole sale entity comprises a customer care entity or functionality, wherein the customer determination entity or functionality provides an internet protocol connection to the customer premises equipment in view of realizing or providing to the customer premises equipment a walled garden functionality provided or realized by the customer care entity or functionality.

It is thereby advantageously possible to easily and effectively implement exemplary embodiments of a method according to the invention.

According to still another embodiment of the present invention, it is advantageously possible and preferred that the whole sale entity and especially the customer care entity or functionality is separated, especially organizationally separated, from both the broadband access network and the service provider.

It is thereby advantageously possible to easily and effectively implement exemplary embodiments of a method according to the invention.

Furthermore, according to a preferred embodiment of the present invention, the broadband access network comprises a control plane, especially as part of a central office point of delivery, wherein, in view of subsequently realizing or preparing an operational usage of the hitherto unknown customer premises equipment during or after the second step, the configuration command is transmitted to the broadband access network, especially its control plane, using the second application programming interface, wherein especially the actual operational usage of the hitherto unknown customer premises equipment requires a reinitialization or a reboot of the customer premises equipment, the reinitialization or the reboot being especially initiated or triggered by the broadband access network, especially the specific access node.

It is thereby advantageously possible to easily and effectively implement exemplary embodiments of a method according to the invention.

According to another embodiment of the present invention, it is furthermore advantageously possible and preferred that besides the broadband access network and the service provider at least one further broadband access network and/or at least one further service provider is connected to the whole sale entity, wherein in case of the further broadband access network being connected to the whole sale entity, the further broadband access network comprises at least one further access node being enabled to operatively connect a further customer premises equipment to the further telecommunications network in view of providing communication services and/or communication access services to a further user related or connected to the further customer premises equipment, wherein the further broadband access network is able to provide communication access services to the further customer premises equipment via providing a further whole sale interface to one out of the service provider and, if present, the further service provider, wherein the one out of the service provider and, if present, the further service provider is able to provide communication services to the further customer premises equipment and/or to the related or connected further user using the further whole sale interface and the broadband access network, in case of the further service provider being connected to the whole sale entity, the broadband access network is able to provide communication access services to the customer premises equipment via providing the whole sale interface also to the further service provider, wherein the further service provider is able to provide communication services to the customer premises equipment and/or to the related or connected user using the whole sale interface and the broadband access network, especially instead of the service provider providing such communication services to the customer premises equipment.

It is thereby advantageously possible to easily and effectively implement exemplary embodiments of a method according to the invention.

According to still another embodiment of the present invention, it is advantageously possible and preferred that the broadband access network comprises a control plane, especially as part of a central office point of delivery, wherein, during the third step and prior to the first step, the control plane transmits a service provider indication to the whole sale entity, the service provider indication referring to or indicating the service provider or the plurality of service providers available at or via the specific access node.

It is thereby advantageously possible to easily and effectively implement exemplary embodiments of a method according to the invention.

Furthermore, the present invention relates to a system for operating a broadband access network of a telecommunications network with a customer premises equipment, the system comprising, besides the broadband access network, a service provider and a whole sale entity, wherein the broadband access network comprises at least one access node, wherein a specific access node of the broadband access network is enabled to operatively connect the customer premises equipment to the telecommunications network in view of providing communication services and/or communication access services to a user related or connected to the customer premises equipment, wherein the broadband access network is able to provide communication access services to the customer premises equipment via providing a whole sale interface to a service provider, wherein the service provider is able to provide communication services to the customer premises equipment and/or to the related or connected user using the whole sale interface and the broadband access network, wherein, in case that the customer premises equipment is unknown to the telecommunications network or has previously not been connected to the telecommunications network, the whole sale entity is involved, the whole sale entity being separated from both the broadband access network and the service provider, wherein, in view to realize or to prepare the operational usage of the customer premises equipment, the system is configured such that:

the whole sale entity transmits an authentication request to the service provider using a first application programming interface, the first application programming interface being exposed by the service provider, in case of the authentication request having been granted, the whole sale entity transmits a configuration command to the broadband access network using a second application programming interface, the second application programming interface being exposed by the broadband access network.

Additionally, the present invention relates to a whole sale entity provided to be used as part of an inventive system.

Still additionally, the present invention relates to a program comprising a computer readable program code which, when executed on a computer and/or on a network node of a telecommunications network and/or on a network node of a service provider and/or on a network node of a whole sale entity, causes the computer and/or the network node of the telecommunications network and/or the network node of the service provider and/or the network node of the whole sale entity to perform exemplary embodiments of a method according to the invention.

Furthermore, the present invention relates to a computer-readable medium comprising instructions which when executed on a computer and/or on a network node of a telecommunications network and/or on a network node of a service provider and/or on a network node of a whole sale entity, causes the computer and/or the network node of the telecommunications network and/or the network node of the service provider and/or the network node of the whole sale entity to perform exemplary embodiments of a method according to the invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part may be present as well, as part of the telecommunications network 100. User equipments or client devices 51, 52 are connected to the telecommunications network 100 via a (broadband) access network 120. The telecommunications network 100 preferably comprises (but not necessarily), especially as part of the broadband access network 120, at least one logical or physical central office point of delivery 110 that is preferably realized within a (mini) data center and that is especially handling different access requirements, especially different access possibilities, of the client devices 51, 52 to network functionalities provided by the telecommunications network 100 or via the telecommunications network 100. In addition, the telecommunications network 100 typically also comprises—besides the broadband access network 120—a core network 101. The client devices 51, 52 are typically connected to the logical or physical central office point of delivery 110 via a customer premises equipment device 50 (e.g. located in a home or flat or building) or via a customer premises equipment entity or functionality that might be built into or realized by the client devices 51, 52. Another customer premises equipment 50' (e.g. located in another home or flat or building) may be used for serving or connecting other client devices. Preferably (but not necessarily), the central office point of delivery 110 comprises a switching fabric 115 comprising a plurality of spine network nodes and typically also a plurality of leaf network nodes which are not explicitly represented in FIG. 1. The telecommunications network 100 furthermore also comprises a business and/or operations support system 105.

Figure 2:
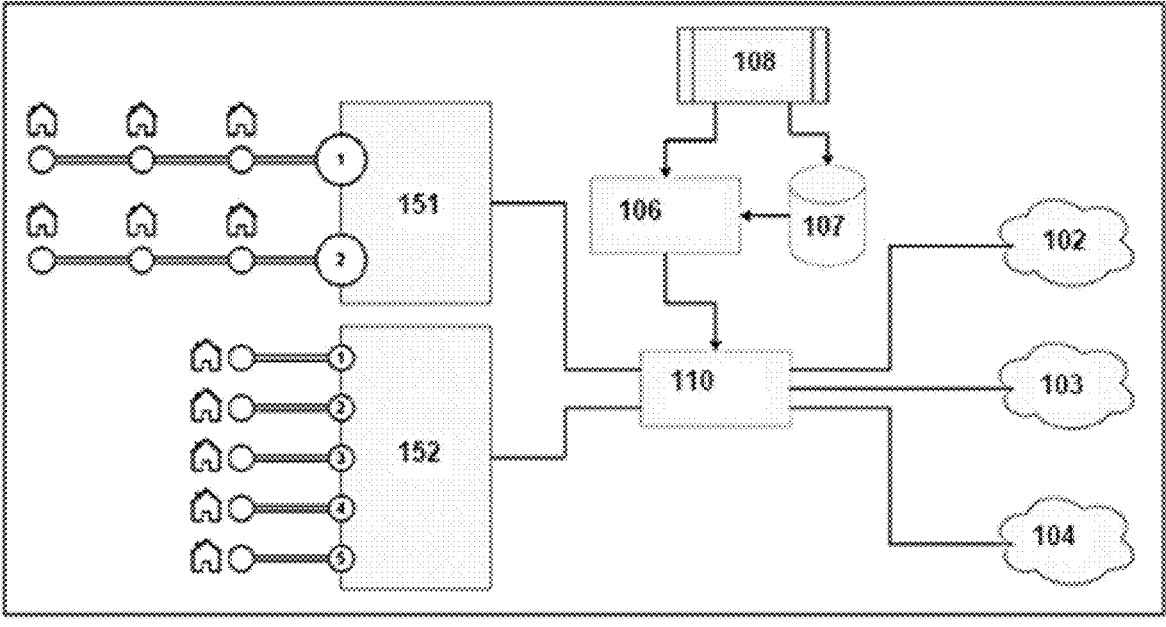
FIG. 2 schematically illustrates another exemplary representation of a telecommunications network according to the present invention, having a broadband access network, and using different access technologies in order to provide network connectivity to different users or subscribers.

FIG. 2 schematically illustrates another exemplary representation of a telecommunications network 100 according to the present invention, having a broadband access network 120, and using different access technologies in order to provide network connectivity to different users or subscribers. In this respect, the telecommunications network 100 schematically shown in FIG. 2 comprises a first access node 151, such as an optical line terminal (OLT), having a plurality of access (node) ports (schematically and exemplarily numbered "1" and "2") in FIG. 2. Each one of these access ports is able to serve a plurality of customer premises equipments and the associated client devices (in the exemplary embodiment shown three customer premises equipments); each customer premises equipment being schematically represented, in FIG. 2, via a small house symbol or icon. This means that a shared medium (or a shared manner of communication) is used between this plurality of customer premises equipments, and the respective access node (or, rather, between these customer premises equipments, and the respective access node port of the access node). Furthermore, the telecommunications network 100 shown in FIG. 2 also comprises a second access node 152, such as an MSAN, serving DSL customers. Likewise, such an MSAN access node 152 comprises a plurality of access (node) ports (schematically and exemplarily numbered "1" to "5") in FIG. 2. In contrast to the first access node 151, these access (node) ports of the second access node 152 are only able to serve one customer premises equipment (and the associated client devices), each customer premises equipment again being schematically represented via a small house symbol or icon. The access nodes 151, 152 are connected to a service edge (entity or functionality) or broadband network gateway (entity or functionality), especially realized in or as part of a central office point of delivery 110, and the service edge (entity or functionality) or broadband network gateway (entity or functionality) 110 is controlled by a policy server 106 (with an associated policy storage entity or functionality 107, and an associated application programming interface 108. Furthermore, the service edge (entity or functionality) or broadband network gateway (entity or functionality) 110 (or central office point of delivery 110) is connected to the internet 102 and/or to a whole sale interface 103, especially an A10NSP-interface 103 (or A10NSP carrier 103) and/or to an multiprotocol label switching network 104 (or core network 101).

According to the present invention, the method relates to the operation of the broadband access network 120 with the customer premises equipment 50 (or a specific (one) customer premises equipment (of, typically, a plurality of customer premises equipments)), the broadband access network 120 comprising typically a plurality of access nodes 151, 152, 153, wherein a specific access node 151 of the broadband access network 120 is enabled to operatively connect the (specific) customer premises equipment 50 to the telecommunications network 100 in view of providing communication services and/or communication access services to a user related or connected to the customer premises equipment 50 (i.e. especially a client device connected to that specific customer premises equipment 50).

The broadband access network 120 especially comprises a customer determination entity or functionality 130 such that, in case that the customer premises equipment 50 is unknown to the telecommunications network 100 or has previously not been connected to the telecommunications network 100, an identifier information, relating to the customer premises equipment 50, is transmitted, by the customer premises equipment 50, to the specific access node 151, and, a user plane communication channel is established between the customer premises equipment 50 and the customer determination entity or functionality 130, via the specific access node 151.

Especially, the identifier information relating to the customer premises equipment 50 corresponds to a hardware address of the customer premises equipment 50 (e.g. a serial number or another identifier), especially a medium access control (MAC) address.

According to the present invention, the broadband access network is able to provide communication access services to the customer premises equipment via providing a whole sale interface to a service provider, and the service provider is able to provide communication services to the customer premises equipment and/or to the related or connected user using the whole sale interface and the broadband access network, and, in case that the customer premises equipment is unknown to the telecommunications network or has previously not been connected to the telecommunications network, a whole sale entity is involved, wherein, in view to realize or to prepare the operational usage of the customer premises equipment, the method comprises the steps of, in a first step, the whole sale entity transmits an authentication request to the service provider using a first application programming interface, the first application programming interface being exposed by the service provider, and, in a second step and in case of the authentication request having been granted, the whole sale entity transmits a configuration command to the broadband access network using a second application programming interface, the second application programming interface being exposed by the broadband access network.

This is schematically shown in FIG. 3 which illustrates the network architecture according to the present invention including, besides the access provider 100' or access provider functionality 100', as well as the service provider 300 or service provider functionality 300, the whole sale provider 200 or whole sale provider functionality 200. In the schematical representation of FIG. 3, the service provider 300 is or corresponds to the service provider 300 responsible for the (specific) customer premises equipment 50, whereas another customer premises equipment 50' might be served by a further service provider 301 (or further service provider functionality 301), and still another customer premises equipment 50" might be served by still a further service provider 302 (or still further service provider functionality 302). Both the (specific) customer premises equipment 50 and the further customer premises equipment 50' are linked or connected (or served regarding access connectivity) by the (specific) access node 151 of the broadband access network 120 of the telecommunications network 100.

In the exemplary embodiment shown in FIG. 3 (with respect to the (specific) customer premises equipment 50 and the further customer premises equipment 50'), this is possible due to the (specific) customer premises equipment 50 being connected to the specific access node 151 using a shared medium, especially a point-to-multipoint access mechanism and especially a passive optical network or a part thereof or a data over cable service interface specification coaxial, DOCSIS, cable network.

Especially, the (specific) customer premises equipment 50 (and as well the further customer premises equipment 50') corresponds to an optical network terminal or an optical network unit, and the specific access node 151 especially corresponds to an optical line terminal.

According to the present invention, the broadband access network 120 of the telecommunications network 100 is provided or is part of the access provider 101' or the access provider functionality 101'. According to the exemplary representation of FIG. 3, the access provider 101' (or the broadband access network 120, i.e. the telecommunications network 100) comprises a control plane 125, especially as part of a central office point of delivery 110.

The control plane 125 determines that the customer premises equipment 50 is unknown to the telecommunications network 100 or has previously not been connected to the telecommunications network 100.

Upon such a determination, the customer determination entity or functionality 130 is invoked and provided with parameters, especially comprising the identifier information relating to the customer premises equipment 50, Especially, the determination that the customer premises equipment 50 is indeed unknown to the telecommunications network 100 or has indeed previously not been connected to the telecommunications network 100 uses parameters transmitted on a control plane channel, especially using a ranging protocol, between the customer premises equipment 50 and the specific access node 151.

According to the present invention, the control plane 125 provides session control to a data steering entity or functionality 126, and activates the customer determination entity or functionality 130. In the context of the present invention, the customer determination entity or functionality 130 is also referred to by the term of 'customer catcher' or customer catcher entity or functionality 130. Additionally, the control plane 125 configures inject parameters to the customer determination entity or functionality 130.

According to a preferred embodiment of the present invention, the customer determination entity or functionality 130 provides an internet protocol connection to the customer premises equipment 50 in view of realizing or providing, to the customer premises equipment 50, a walled garden functionality.

It is thereby especially possible that at least one internet protocol address is able to be used by the customer premises equipment 50, and a default gateway is provided to the customer premises equipment 50, the default gateway especially being provided or realized by a proxy entity or functionality. Preferably according to the present invention, the walled garden functionality is provided or realized by a customer care entity or functionality 250 which might be part of the access provider functionality 101' but would preferably be part of a whole sale provider 200 or whole sale provider functionality 200 (i.e. external to the access provider functionality 101').

According to the present invention, especially in view of subsequently realizing or preparing an operational usage of the hitherto unknown customer premises equipment 50, pieces of customer authentication or credential information are transmitted, using the internet protocol connection between the customer determination entity or functionality 130 and the customer premises equipment 50, by a user of the customer premises equipment 50.

Especially, based on this communication between the customer premises equipment 50 and the customer determination entity or functionality 130, the pieces of customer authentication or credential information are transmitted to the customer care entity or functionality 250. Via application programming interfaces between the whole sale provider 200 and the service provider 300 (or the plurality of service providers 300, 301, 302) such pieces of customer authentication or credential information are able to be used—using a further application programming interface between the whole sale provider 200 and the access provider 101'—to properly configure the communication access or the connectivity (to the telecommunications network 100) of the specific customer premises equipment 50 (or of the combination of the specific customer premises equipment 50 and the specific access node 151) such that (perhaps after a reconfiguration time interval or after a restart or reboot operation of the customer premises equipment 50) the previously unknown customer premises equipment 50 is correctly recognized and successfully configured and initialized.

The application programming interface between the whole sale provider 200 and the service provider 300 (in the context of the present invention also referred to as the first application programming interface) is designated, in FIG. 3, via reference sign 340 for the side of the service provider 300, and via reference sign 340' for the side of the whole sale provider 200 (and via reference signs 341, 342 for the further service providers 301, 302). The further application programming interface between the whole sale provider 200 and the access provider 101' (in the context of the present invention also referred to as the second application programming interface) is designated, in FIG. 3, via reference sign 140 for the side of the access provider 101', and via reference sign 140' for the side of the whole sale provider 200. The first application programming interface 340, 340' is exposed by the service provider 300, and the second application programming interface 140, 140' is exposed by the access provider 101', i.e. especially the broadband access network 120.

Hence, it is especially preferred according to the present invention that the broadband access network 120 provides communication access services to the customer premises equipment 50 via providing a whole sale interface 103, especially an A10NSP-interface, to the service provider 300, wherein the service provider 300 provides communication services to the customer premises equipment 50 using the whole sale interface of the broadband access network 120. In order to realize or prepare the operational usage of the hitherto unknown customer premises equipment 50, the pieces of customer authentication or credential information are transmitted, to the service provider 300, using in-band communication, i.e. the customer premises equipment 50, the customer determination entity or functionality 130, and the customer care entity or functionality 250 (especially located at the whole sale provider 200, i.e. the customer care entity or functionality 250 is especially separated, especially organizationally separated, from the broadband access network 120, i.e. the access provider 101'.

Especially according to the present invention, the customer determination entity or functionality 130 is realized as a container instance in a virtual environment, especially as part of the central office point of delivery 110 of the broadband access network 120, wherein especially, regarding a specific customer premises equipment 50, a specific container instance is invoked as the customer determination entity or functionality 130 serving the specific customer premises equipment 50—i.e. the container instance is especially specific to the customer premises equipment 50 being served, or, in other words: it is preferred that for each unknown customer premises equipment, a specific container instance is created or instantiated.

According to the present invention, especially the customer determination entity or functionality 130 provides the possibility that the pattern of the unknown customer traffic (i.e. being received, from the customer premises equipment 50, by the specific access node 151 and by the customer determination entity or functionality 130) is detected and converted into a uniform format for further processing based on the incoming protocol information of the customer traffic.

Hence, it is advantageously possible that a walled garden (functionality) is activated (even though the customer premises equipment being unknown to the telecommunications network or having previously not been connected to the telecommunications network). Especially, such a customer connection is in a separate network and a connection to the customer care portal (the customer care entity or functionality 250, especially at the whole-sale provider 200) is able to be established.

The goal of the customer determination entity or functionality 130 (or customer catcher) is to provide the possibility of an initial registration (for the considered customer premises equipment before it is identified) and provide basic network-neutral connectivity; typically, the customer determination entity or functionality 130 comprises several parts or groups of functionalities; the mechanism is explicitly activated by the system's (the broadband access network's) control plane 125 when unknown customers (unknown customer premises equipments) are detected. Especially a proxy functionality or proxy is established, and parameters for the proxy are also passed there during activation. These include, e.g., the new optical network terminal serial number as well as the optical line terminal and PON tree identification; especially, these data might be important for the service provider for fast fault clearance.

Preferably, the customer determination entity or functionality 130 is a container on a virtual environment, for example Kubernetes. Especially, each individual unknown customer (unknown customer premises equipment) gets its own container and a data plane shielded from all others; thus, the IP addresses and also the routing within the customer determination entity or functionality 130 to the unknown customer are completely irrelevant, and every unknown customer can get the same IP address, that is conflict-free. Since all traffic going out of the container has to go through the proxy (functionality), the IP address of the proxy to the customer care portal 250 (or customer care entity or functionality 250) is relevant and not the IP address of the unknown customer, and this may be realized through the virtual environment as a NAT (network address translation) connection, it is only a TCP (transmission control protocol) connection. (Another variant would be to span a separate network to centralize the customer catcher).

Preferably according to the present invention, the customer determination entity or functionality 130 is also able to be used for other use cases, e.g., for access connections that are not yet provisioned, or for customers who still have unpaid invoices. The same principle is able to be applied: the destination should be changed from the customer care portal to another portal; hence, the customer determination entity or functionality or customer catcher 130 can be used for all kinds of situations.

Hence, according to the present invention, on the access side, i.e., between the unknown customer (or customer premises equipment) 50 and the customer determination entity or functionality 130, a walled-garden connection (towards the customer care entity or functionality 250) is established. The customer determination entity or functionality 130 should interpret the incoming (user plane) data packets from the unknown customer 50 accordingly and also perform appropriate actions; if it is a PPP (point-to-point-protocol) connection, the customer determination entity or functionality 130 should provide a PPP session with an IP address and default routers; if it is a DHCP (dynamic host configuration protocol) connection, the customer determination entity or functionality 130 should do the same with DHCP. Preferably, the customer determination entity or functionality 130 effectively works with all possible VLAN (virtual local area network) combinations. In the case of bit-stream Layer 2, the access provider 101' does not know which configuration a customer might use. However, the task of the customer determination entity or functionality 130 is to intercept everything that is possible; it is therefore able to respond to both single-TAG and double-TAG VLANs, including the various forms of double-TAG (8100/88a8), the goal being to give the connection (it could also be more than one) an IP address and provide a default gateway. Especially according to the present invention (and once the connection to the unknown customer premises equipment 50 has been given an IP address and has also been given a default gateway), a catch-all mechanism is realized: the catch-all mechanism allows the customer determination entity or functionality 130 to always receive all IP packets from the customer premises equipment 50, and the customer (or customer premises equipment 50) should decide what to do on the basis of the IP addresses and services; if the customer tries to start a DNS request, the catch-all mechanism should answer it sensibly, and the same applies to various other services. The NTP (network time protocol) should be answered correctly; if NTP is missing or wrong, for example, there will be a problem with SSL (secure sockets layer) later.

Especially, in case of a HTTP (hypertext transfer protocol) request or a HTTPS (hypertext transfer protocol secure) request is detected, it is caught and answered as a redirect to the customer care portal. In doing so, the catch-all mechanism of the customer determination entity or functionality 130 is also forced to run an SSL man-in-the-middle proxy that creates SSL certificates on-the-fly, e.g. in case that the customer is in the walled garden and calls up a browser instance: the browser first calls the home page (probably mostly Bing or Google); the request should now be answered with a redirect to the customer care portal, but this only works smoothly if the redirect server responds with the correct SSL certificate of the called page; if the redirect server uses an invalid certificate, then the customer will receive a certificate error message that may not be able to be clicked away; the result would be that the redirect would no longer work and the customer would have to enter the URL himself.

Due to the introduction of HTTP Public Key Pinning (HPKP), which is no longer practically implemented, but also due to TLS 1.3, the Man-In-The-Middle proxy will probably no longer work in the future. For this reason, this procedure should be avoided in the future. This means that the customer has to enter the URL to the customer care portal himself. With unencrypted HTTP connections, it is still possible to send a redirect, but unencrypted HTTP connections hardly exist anymore. It should also be noted that browsers increasingly only establish HTTPS connections, and no longer try HTTP first, but go straight to HTTPS if it is not explicitly entered.

The catch-all mechanism therefore ensures that all HTTP/HTTPS connections that are not directed to the customer care portal are ignored. In doing so, a TCP reset should be sent so that the browser does not block. Since the development of the operating systems and also other devices are more and more developed in the direction of permanent error-free internet connection, this construct would be tried with all operating systems and devices, since there is neither a standard nor any well-founded documents on the part of the manufacturers for this.

However, NTP and DNS should work as known from the Internet. The DNS reports the real IP addresses to the operating system. If the catch-all DNS delivers the IP address of a proxy or a web server for all host names, this has fatal consequences for the client PC. This is because it remembers this IP for a certain time. Even if you lower the TTL, it is not guaranteed that the operating system can cope with small TTLs. The fatal thing is that when the real Internet is available again, the client PC usually does not notice this and continues to work with the IP address given to it by the walled-garden DNS. This means that the client PC effectively cannot access the pages, for example the configured home page, even after the Internet has been enabled, which probably greatly confuses the customer.

Making the client clear their DNS cache, or have to reboot, should be avoided. Therefore, it is advantageous that the DNS distributes the real correct Internet IP addresses.

In summary, the following rules can possibly be defined: DNS is answered correctly, NTP can be answered locally, HTTP/HTTPS Internet check URLs from the operating system are answered correctly (Android, for example, shuts down the network if the request fails), HTTP/HTTPS to the customer self-care is allowed through, everything else is answered with a TCP reset or UDP Unreachable.

Preferably according to the present invention, the proxy (functionality) has the task to enrich all HTTP and HTTPS accesses to the customer care portal (or customer care entity or functionality) 250 with the information from the control plane 125. The corresponding values are especially written in the HTTP-X headers. Especially, the information is only seen by the customer care portal 250 and no one else. The portal 250 then decides what to do with the data. The more data the proxy passes on, the less the customer has to enter himself.

Hence, the control plane 125 is implemented such that it redirects an unknown customer to the customer catcher 130.

As a consequence, according to the present invention, any number of service providers can participate in such a system. In all cases of an unknown customer premises equipment 50, there will be a forwarding into the whole sale provider system 200, in all cases of a known user, there will be a Layer 2 pass-through. For both cases, the Service Provider is "irrelevant" to the Access POD.

With the high level of abstraction, multiple access providers can also be connected to the system. This allows internal processes to develop independently and in parallel without conflicts, with core functions on CRM being developed only once. Also the activation of the whole system is independent. For the customer, the difference in access technology is/should be transparent.

Of course, the system is able to serve multiple service providers and multiple access providers. In this case, the Whole-Sale Provider then plays the role of a switch, it can correctly control the requests and the processing, it already has all the information.

This scenario fulfills all legal requirements for network neutrality, plus the possibility that the experienced user can carry out a changeover himself in a fully automated manner and without personnel costs.

The following provides some additional discussion regarding certain terms used in the context of the present invention:

access provider 101': An access provider provides the access technology (technology and lines). This includes the access nodes, e.g., the OLT (optical line terminal), the service edge and also the decision of controlling the customer connections. An Access provider has a system where it has links from ONT serial numbers to Line ID, as well as a link from Line ID and Server Provider. An access provider provides interfaces to be able to assign new or changed ONT serial numbers to a Line-ID (second application programming interface 140, 140'.

An access provider is the organizational unit that provides the customer with network access, i.e., that puts the cable into a customer's house and connects it to a service edge, which in turn, depending on the policy, distributes the customer's data stream to the networks.

Examples of an access provider: FTTC Provider in terms of xDSL or PON, would be an access provider. But Vodafone with its cable network is also an access provider.

Both use different hardware and software internally, Deutsche Telekom uses so-called OLT for PON, Cable Provider uses CMTS for the cable network. The use of the right technology is up to the access provider. The output, i.e. the customer's data stream, can be forwarded to the networks on the basis of a policy. The policy relations are also different, while the ONT serial number is used in the PON, the MAC of the CPE is used in the cable network. The policy is strongly dependent on the technology. While the API does not have generic attributes, it does have generic functions such as: direct customer X to network Y.

The access provider is also responsible for the implementation and compliance of QoS policies. The implementation does not matter, but somewhere there should be a possibility of bandwidth guarantee and queues. The control of the QoS classes is given by the access provider, because only the access provider has the sovereignty and the knowledge of the used technology. The bandwidths to be set are assigned dynamically per product contract of the individual customers.

Currently, a large part of the tasks are already handled by OSS/BSS and policy control systems.

Line ID: According to the NGA Forum, a line ID is the primary key for an access provider to identify a line with product and customer. The line ID is a character string with a maximum of 21 digits that is formed from the country code, carrier code and a customer hash. An example of a line ID: DEU.ABCD.KJH9J7A. Other access providers may use a different internal identification.

Service Edge 110: A Service Edge can be a single device, or can be comprised of multiple devices. Actually, it is a function that can be placed on different hardware.

How a Service Edge is internally structured is not relevant. The structure and functionality is determined by the access provider. However, the service edge has the task of identifying the data stream of a customer and forwarding it to the network accordingly. The identification can be done either by a policy server or by static configuration, again it is not relevant how the access provider does this or what protocols it wants to use for this.

It is up to the access provider to define the correct choice of protocols for identification. This may include PPPoE, DHCP, IPv6 RA, or other access protocols. Of course, the Service Edge should be able to operate the protocol appropriately.

Service Provider 300: A service provider is an organizational entity that has a contractual relationship with the end customer. A service provider has no contact with the access hardware used (that is what the access provider is for). The service provider handles all relevant parts of customer communication, product customization, sales, billing and other customer-related parts.

A service provider should be able to control an access provider. This refers in the first phases only to the adjustments of the identification of a customer. For example, the customer reports a new ONT serial number, which leads to the service provider having to talk to the access provider.

However, a service provider also processes product changes, new customers, cancellations and so on.

Unknown Customer: An unknown customer is meant here in the sense of an unknown subscriber on the access network who has not registered himself and/or his terminal device. The customer itself may or may not be contractually managed as a customer.

In this document, however, this is completely irrelevant. This document refers to the technology, and if an unknown customer is referred to, then the customer, or his line and/or connection, and thus his product are not clarified.

In an xDSL environment, this does not actually happen, as the Line ID and a direct connection to the customer can be established. In a PON or shared environment, you have the case immediately as soon as the customer exchanges his ONT. The ONT serial number reported on the network then no longer matches any database entries.

And that is exactly what an unknown customer is in this document. Regardless of whether he has a contract or not. In the network he is considered as unknown. Besides, a customer is basically unknown if he has no contract, this is implicitly included.

This also applies to a service employee with a test ONT. This person is also to be classified as an unknown customer if his ONT serial number is not registered.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a broadband access network of a telecommunications network with a customer premises equipment, wherein the broadband access network comprises at least one access node, wherein a first access node of the broadband access network is configured to operatively connect the customer premises equipment to the telecommunications network for providing services to a user, wherein the broadband access network is configured to provide communication access services to the customer premises equipment via providing a first interface to a service provider, wherein the service provider is configured to provide communication services to at least one of the customer premises equipment or the user using the first interface and the broadband access network, wherein a first entity is involved based on the customer premises equipment being unknown to the telecommunications network or having not previously been connected to the telecommunications network, wherein the method comprises the following steps:

in a first step, the first entity transmits an authentication request to the service provider using a first application programming interface, wherein the first application programming interface is provided by the service provider; and in a second step and based on the authentication request having been granted, the first entity transmits a configuration command to the broadband access network using a second application programming interface, wherein the second application programming interface is provided by the broadband access network.

2. The method according to claim 1, wherein the authentication request comprises identifier information relating to the customer premises equipment as well as authentication or credential information, wherein both the identifier information and the authentication or credential information are transmitted, by the customer premises equipment and in a third step prior to the first step, to the first access node;

wherein the identifier information is transmitted, by the customer premises equipment, using a control plane channel and using a ranging protocol, between the customer premises equipment and the first access node; and wherein the broadband access network comprises a customer determination entity or functionality, and the authentication or credential information is transmitted, by the customer premises equipment, using a user plane communication channel between the customer premises equipment and the customer determination entity or functionality, via the first access node.

3. The method according to claim 2, wherein the customer premises equipment is connected to the first access node using a shared medium, a point-to-multipoint access mechanism, a passive optical network or a part thereof, or a data over cable service interface specification coaxial (DOCSIS) cable network;

wherein the customer premises equipment corresponds to an optical network terminal or an optical network unit, and wherein the first access node corresponds to an optical line terminal; and wherein the identifier information relating to the customer premises equipment corresponds to a hardware address of the customer premises equipment, wherein the hardware address is a medium access control (MAC) address.

4. The method according to claim 2, wherein the first entity comprises a customer care entity or functionality configured to provide an internet protocol connection to the customer premises equipment.

5. The method according to claim 4, wherein the first entity and the customer care entity or functionality are organizationally separate from both the broadband access network and the service provider.

6. The method according to claim 2, wherein the broadband access network comprises a control plane as part of a central office point of delivery, wherein, during the third step and prior to the first step, the control plane transmits a service provider indication to the first entity, the service provider indication referring to or indicating the service provider or a plurality of service providers available at or via the first access node.

7. The method according to claim 1, wherein the broadband access network comprises a control plane as part of a central office point of delivery, wherein, during or after the second step, the configuration command is transmitted to the control plane of the broadband access network using the second application programming interface; and wherein the operational usage of the unknown customer premises equipment requires a reinitialization or a reboot of the customer premises equipment, wherein the reinitialization or the reboot is initiated or triggered by the first access node of the broadband access network.

8. The method according to claim 1, wherein besides the broadband access network and the service provider at least one of a further broadband access network or a further service provider is connected to the first entity; and wherein:

the further broadband access network is connected to the first entity, the further broadband access network comprises at least one further access node configured to operatively connect a further customer premises equipment to the further telecommunications network for providing services to a further user, the further broadband access network is configured to provide communication access services to the further customer premises equipment via providing a further first interface to one out of the service provider and the further service provider, the one out of the service provider and the further service provider is configured to provide communication services to at least one of the further customer premises equipment or the further user using the further first interface and the broadband access network.

9. The method according to claim 1, wherein besides the broadband access network and the service provider at least one of a further broadband access network or a further service provider is connected to the first entity; and wherein:

the further service provider is connected to the first entity, the broadband access network is configured to provide communication access services to the customer premises equipment via providing the first interface also to the further service provider, and the further service provider is configured to provide communication services to at least one of the customer premises equipment or the user using the first interface and the broadband access network, instead of the service provider providing such communication services to the customer premises equipment.

10. A system for operating a broadband access network of a telecommunications network with a customer premises equipment, the system comprising:

the broadband access network;

a service provider; and a first entity;

wherein the broadband access network comprises at least one access node, wherein a first access node of the broadband access network is configured to operatively connect the customer premises equipment to the telecommunications network for providing services to a user;

wherein the broadband access network is configured to provide communication access services to the customer premises equipment via providing a first interface to a service provider, wherein the service provider is configured to provide communication services to at least one of the customer premises equipment or the user using the first interface and the broadband access network;

wherein the first entity is involved based on the customer premises equipment being unknown to the telecommunications network or having not previously been connected to the telecommunications network, wherein the first entity is separate from both the broadband access network and the service provider; and wherein the first entity is configured to:

transmit an authentication request to the service provider using a first application programming interface, wherein the first application programming interface is provided by the service provider; and based on the authentication request having been granted, transmit a configuration command to the broadband access network using a second application programming interface, wherein the second application programming interface is provided by the broadband access network.

11. A non-transitory computer-readable medium having processor-executable instructions stored thereon for operating a broadband access network of a telecommunications network with a customer premises equipment, wherein the broadband access network comprises at least one access node, wherein a first access node of the broadband access network is configured to operatively connect the customer premises equipment to the telecommunications network for providing services to a user, wherein the broadband access network is configured to provide communication access services to the customer premises equipment via providing a first interface to a service provider, wherein the service provider is configured to provide communication services to at least one of the customer premises equipment or the user using the first interface and the broadband access network, wherein a first entity is involved based on the customer premises equipment being unknown to the telecommunications network or having not previously been connected to the telecommunications network, wherein the processor-executable instructions, when executed, facilitate performance of the following steps:

in a first step, the first entity transmits an authentication request to the service provider using a first application programming interface, wherein the first application programming interface is provided by the service provider; and in a second step and based on the authentication request having been granted, the first entity transmits a configuration command to the broadband access network using a second application programming interface, wherein the second application programming interface is provided by the broadband access network.

* * * * *